US012592089B2

(12) United States Patent
Lattemann et al.

(10) Patent No.: US 12,592,089 B2
(45) Date of Patent: Mar. 31, 2026

(54) METHOD OF CLASSIFYING A ROAD SURFACE OBJECT, METHOD OF TRAINING AN ARTIFICIAL NEURAL NETWORK, AND METHOD OF OPERATING A DRIVER WARNING FUNCTION OR AN AUTOMATED DRIVING FUNCTION

(71) Applicant: Bayerische Motoren Werke Aktiengesellschaft, Munich (DE)

(72) Inventors: Felix Lattemann, Munich (DE); Burkard Rendenbach, Munich (DE); Maxim Sidorov, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 173 days.

(21) Appl. No.: 18/374,033

(22) Filed: Sep. 28, 2023

(65) Prior Publication Data

US 2024/0104940 A1 Mar. 28, 2024

(30) Foreign Application Priority Data

Sep. 28, 2022 (EP) .................................... 22198483

(51) Int. Cl.
*G06V 20/56* (2022.01)
*B60W 60/00* (2020.01)
(Continued)

(52) U.S. Cl.
CPC ......... *G06V 20/588* (2022.01); *B60W 60/001* (2020.02); *G01C 21/3815* (2020.08);
(Continued)

(58) Field of Classification Search
CPC .... G06V 20/588; G06V 10/774; G06V 10/82; B60W 60/001; B60W 2420/403; B60W 2520/10; B60W 2552/35; B60W 2556/40; G01C 21/3815; G08G 1/16; G06F 2218/18; G06F 18/2414
See application file for complete search history.

(56) References Cited

U.S. PATENT DOCUMENTS 9,626,763 B1 * 4/2017 Hoye ...................... B60R 11/04
2017/0067750 A1 * 3/2017 Day ................. G08G 1/096783
(Continued)

OTHER PUBLICATIONS

Extended European Search Report issued in European Application No. 22198483.4 dated Mar. 3, 2023 (8 pages).
(Continued)

*Primary Examiner* — Hitesh Patel
*Assistant Examiner* — Shahira Baajour
(74) *Attorney, Agent, or Firm* — Crowell & Moring LLP

(57) ABSTRACT

A road surface is classified by providing a set of data points that is attributable to a same road surface object. Each data point specifies a first variable and a second variable. For each data point, the first variable characterizes a horizontal motion exhibited by a vehicle when driving over the road surface object and the second variable characterizes a vertical motion exhibited by said vehicle when driving over the road surface object. The set of data points are classified using an artificial neural network with regard to a relevance of the road surface object for a driver warning function or an automated driving function.

10 Claims, 7 Drawing Sheets

Providing a set of data points that is attributable to a same road surface object, each data point specifying a first variable and a second variable, wherein, for each data point, the first variable characterizes a horizontal motion exhibited by a vehicle when driving over the road surface object and the second variable characterizes a vertical motion exhibited by said vehicle when driving over the road surface object Classifying the set of data points by means of an artificial neural network with regard to a relevance of the road surface object for a driver warning function or an automated driving function

(51) Int. Cl.

| | |
|---|---|
| *G01C 21/00* | (2006.01) |
| *G06V 10/774* | (2022.01) |
| *G06V 10/82* | (2022.01) |
| *G08G 1/16* | (2006.01) |

(52) U.S. Cl.
CPC ............ *G06V 10/774* (2022.01); *G06V 10/82* (2022.01); *G08G 1/16* (2013.01); *B60W 2420/403* (2013.01); *B60W 2520/10* (2013.01); *B60W 2552/35* (2020.02); *B60W 2556/40* (2020.02)

(56) References Cited

U.S. PATENT DOCUMENTS

| | | | |
|---|---|---|---|
| 2020/0250984 A1* | 8/2020 | Kundu | B60W 10/20 |
| 2022/0082705 A1* | 3/2022 | Graves | G01S 19/50 |
| 2022/0292666 A1* | 9/2022 | Zhang | G06F 18/24 |

OTHER PUBLICATIONS

Bianco, S. et al., "Benchmark Analysis of Representative Deep Neural Network Architectures", IEEE Access, Digital Object Identifier 10.1109, Oct. 24, 2018, vol. 6, pp. 64270-64277, https://doi.org/10.1109/ACCESS.2018.2877890 (8 pages).

Fan, R. et al., "Computer-Aided Road Inspection: Systems and Algorithms", Mar. 4, 2022, pp. 1-30, https://doi.org/10.48550/arXiv.2203.02355 (30 pages).

Ma, N. et al., "Computer vision for road imaging and pothole detection: a state-of-the-art review of systems and algorithms", Transportation Safety and Environment, 2022, 4:tdac026, pp. 1-15, https://doi.org/10.1093/tse/tdac026 (16 pages).

Varona, B. et al., "A deep learning approach to automatic road surface monitoring and pothole detection", Springer, Personal and Ubiquitous Computing, May 27, 2019, vol. 24, No. 4, pp. 519-534, XP037206290 (16 pages).

Weiss, K. et al., "A survey of transfer learning", J Big Data (2016) vol. 3, pp. 1-40, https://doi.org/10.1186/s40537-016-0043-6 (40 pages).

"(R) Taxonomy and Definitons for Terms Related to Driving Automation Systems for On-Road Motor Vehicles", Surface Vehicle Recommended Practice, SAE (Society of Automotive Engineering) International, J3016™, Sep. 2016, pp. 1-30 (30 pages).

Gorges, C. et al., "Impact detection using a machine learning approach and experimental road roughness classification", Meachnical Systems and Signal Processing, vol. 117, Feb. 1, 2019, pp. 738-756, XP093025730 (19 pages).

Birant, D. et al., "Classification of Scatter Plot Images Using Deep Learning", Dokuz Eyluel Ueniversitesi Muehendislik Fakuel Tesi Fen Ve Muehendislik Dergisi, vol. 24, No. 71, May 16, 2022, pp. 631-642, XP093025726 (12 pages).

Fan, R. et al., "Road Damage Detection Based on Unsupervised Disparity Map Segmentation", IEEE Transactions on Intelligent Transportation Systems, vol. 21, No. 11, Nov. 2020, pp. 4906-4911 (6 pages).

Wang, J. et al., "Deep Learning for Sensor-based Activity Recognition: A Survey", Elsevier, 2017, pp. 1-10 (11 pages).

Chollet, F. et al., "Xception: Deep Learning with Depthwise Separable Convolutions", IEEE Conference on Computer Vision and Pattern Recognition, IEEE Computer Society, 2017, pp. 1800-1807 (8 pages).

* cited by examiner

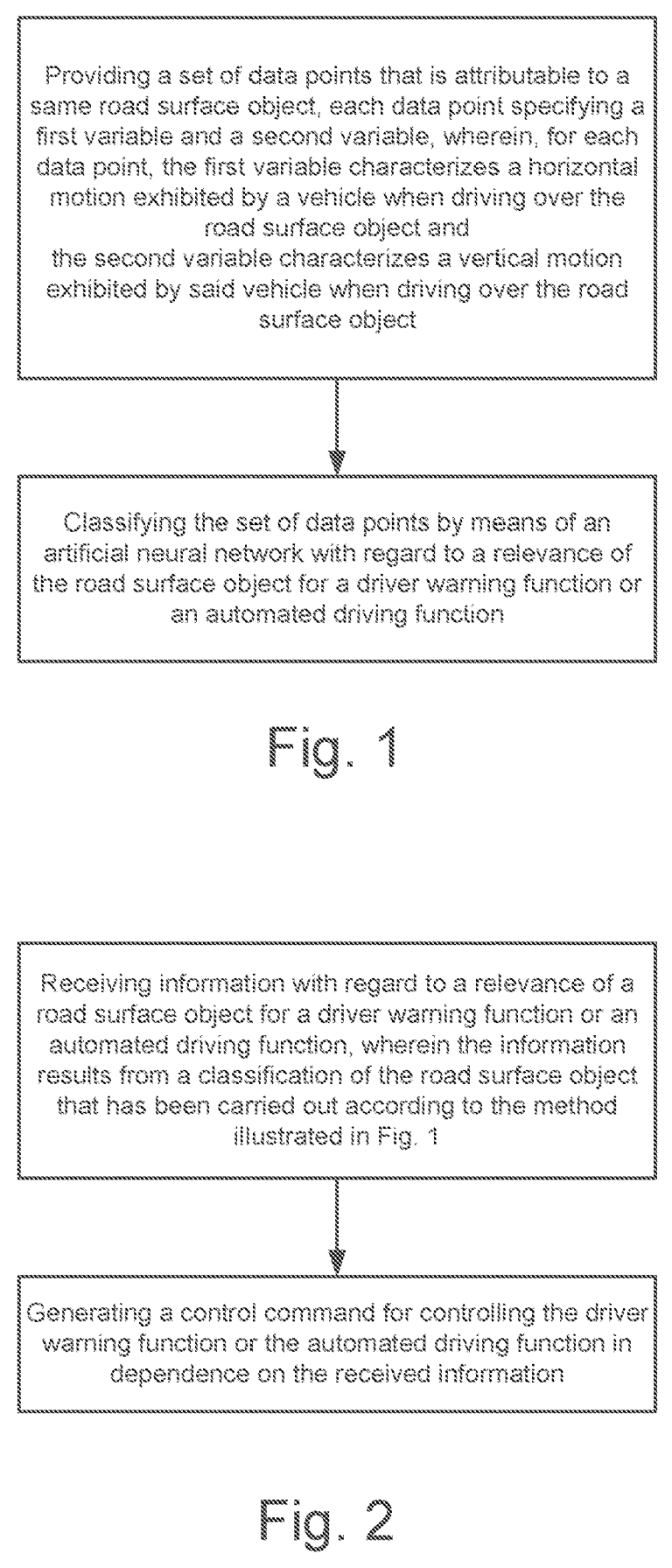

Providing a set of data points that is attributable to a same road surface object, each data point specifying a first variable and a second variable, wherein, for each data point, the first variable characterizes a horizontal motion exhibited by a vehicle when driving over the road surface object and
the second variable characterizes a vertical motion exhibited by said vehicle when driving over the road surface object Classifying the set of data points by means of an artificial neural network with regard to a relevance of the road surface object for a driver warning function or an automated driving function

Fig. 1

Receiving information with regard to a relevance of a road surface object for a driver warning function or an automated driving function, wherein the information results from a classification of the road surface object that has been carried out according to the method illustrated in Fig. 1

Generating a control command for controlling the driver warning function or the automated driving function in dependence on the received information

Fig. 2

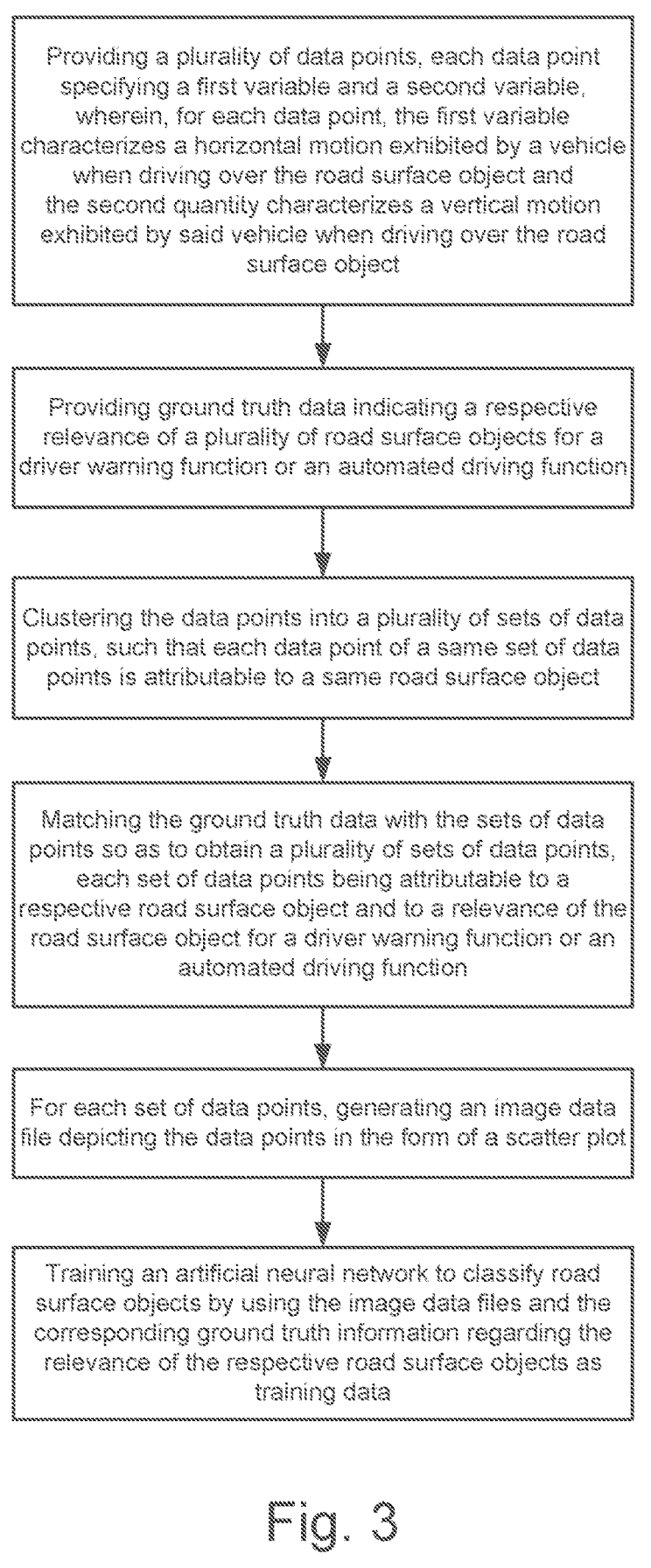

Providing a plurality of data points, each data point specifying a first variable and a second variable, wherein, for each data point, the first variable characterizes a horizontal motion exhibited by a vehicle when driving over the road surface object and the second quantity characterizes a vertical motion exhibited by said vehicle when driving over the road surface object

↓

Providing ground truth data indicating a respective relevance of a plurality of road surface objects for a driver warning function or an automated driving function

↓

Clustering the data points into a plurality of sets of data points, such that each data point of a same set of data points is attributable to a same road surface object

↓

Matching the ground truth data with the sets of data points so as to obtain a plurality of sets of data points, each set of data points being attributable to a respective road surface object and to a relevance of the road surface object for a driver warning function or an automated driving function

↓

For each set of data points, generating an image data file depicting the data points in the form of a scatter plot

↓

Training an artificial neural network to classify road surface objects by using the image data files and the corresponding ground truth information regarding the relevance of the respective road surface objects as training data

Fig. 3

| Event location |
| Event type |
| >>> |

| Location |
| Amplitude |
| Velocity |
| .... |

METHOD OF CLASSIFYING A ROAD SURFACE OBJECT, METHOD OF TRAINING AN ARTIFICIAL NEURAL NETWORK, AND METHOD OF OPERATING A DRIVER WARNING FUNCTION OR AN AUTOMATED DRIVING FUNCTION

CROSS REFERENCE TO RELATED APPLICATION

This application claims priority under 35 U.S.C. § 119 from European Patent Application No. 22198483.4, filed Sep. 28, 2022, the entire disclosure of which is herein expressly incorporated by reference.

BACKGROUND AND SUMMARY

The present subject matter refers to a method of classifying a road surface object, to a method of training an artificial neural network for classifying road surface objects, and to a method for operating a driver warning function or an automated driving function based on information resulting from such a classification. Furthermore, the present subject matter refers to computing devices, computer-readable storage media, and computer programs enabling the above-mentioned methods.

Classification is not only one of the most important approaches in machine learning (ML) in general but it is also relevant for a variety of automotive applications, in particular. For example, in some automotive applications, speed limits must be perceived and therefore a software has to make a decision based on corners, edges and contrast changes in image data provided by vehicle sensors, such as a camera, a RADAR, or a LIDAR. In other applications, other participants in a traffic scenario have to be classified as humans to enable using, for instance, psychological models for behavior planners. Such problems are tackled with a variety of techniques, ranging from well-known methods like the knn-classifier to more complex algorithms like support vector machines all the way to complete black-box approaches like deep learning classification.

Some driver warning functions or automated driving functions (including driver assistance functions) rely on information about road surface objects, such as potholes, that are located ahead of a vehicle. In this context, the task may arise to classify road surface objects that can potentially be harmful for vehicles with regard to their relevance for warning the driver or executing automated driving functions so as to avoid or mitigate the potential harm.

There are numerous different approaches to pothole detection known in the art. These approaches vary especially in the way how the data is collected. For example, systems operating based on optical data (collected by LIDAR or camera), mechanical data (collected by mechanical devices arranged at the suspension system) or vibration-based data (collected using accelerometers) can be distinguished (Varona et al., 2020).

Optical approaches mainly use computer vision techniques or even modern deep learning solutions to identify potholes from the raw images. Traditional approaches use, for instance, disparity maps to extrapolate the potholes from the plane road (Fan & Liu, 2019), whereas the machine learning approaches use image classification networks, object detection or semantic networks (Fan, 2022).

Some vibration-based methods try to detect potholes by analyzing a (continuous) acceleration profile (Ma et al., 2022). This can be done by simply using threshold approaches or classification methods, where the classification can be performed in various ways as well.

For a given application, the choice of approach is obviously dependent on the sensory information that can be collected by the car or processed within time constraints imposed by the application.

Furthermore, the number of features that have to be used by each approach as well as the process of defining them, play an important role. For example, when comparing different methods using ML approaches for deriving information from amplitude time series, the final performance is highly correlated to the feature extraction method. Handcrafting features requires expert knowledge and a lot of domain expertise and can influence the final robustness of the model significantly (Wang et al., 2017).

Generally, when performing classification with ML algorithms, one often crucial task is the so-called feature engineering. This term describes the process of a researcher or developer defining the feature vector that is used as input for the algorithm. This task is way more complex than simply defining the size of a vector. In fact, it comprises the task of operationalizing the real world into a discrete representation that can be described by numbers.

When thinking, for example, of pothole detection, there are numerous features that could be used by a human or an algorithm. However, the features relevant for an algorithm to perform the classification task are not always easy to see and can depend on secondary effects. To exemplify this, the amount of data collected in an area within a certain period of time allows deducing how many cars were driving in this area. This can indicate, for example, that an event is likely to be situated in an urban area (or maybe even in a specific urban area depending on the availability of the devices measuring the data), which can entail road conditions as well.

An easy-to-understand example of this phenomenon can be observed when researching different types of image datasets. One well known bias is the so-called sample bias where the method for sampling causes a biased sample in the end. To give an example, one could think of the task of classifying two breeds of dogs, namely huskies and German shepherds. Using only pictures found, e.g., on the internet is likely to produce a dataset that not only has different dogs in it, but also different backgrounds depending on the class, as a lot of pictures showing huskies were likely taken in a snowy surrounding. Consequently, not only the relevant features from the dog itself, such as the paws, the nose, the ears or the fur, become relevant for performing the task (on the dataset) as accurate as possible, but also whether there is snow in the picture or not. This deviation from the intended behavior (classifying dogs not landscapes) of the model exemplarily illustrates the complexity of defining relevant features for classification tasks.

Furthermore, it should be noted that every step of abstraction, which has to be performed for providing inputs, will cause some sort of bias or errors made by the modelling assumptions. Consequently, there is always a tradeoff in complexity of the model (allowing to use as much information as possible) and simplicity (which reduces the computational complexity). In practical applications, it is crucial to avoid increasing the computational complexity to a level where it is hard to work with the model at all.

Addressing the latter, the increase of computational power of modern computers and graphical processing units (GPU) are one reason why deep learning (DL) is used more and more. However, especially deep artificial neural networks (ANNs) can have millions of weights, which requires hours of training, even on modern machines. Furthermore, even if simply increasing the computational power available for solving mathematical problems is widely possible due to, e.g., cloud computing, this means in consequence increasing the costs for energy consumption or rents.

Finally, a main objective in developing algorithms for classification is to maximize the prediction accuracy as much as possible. To give an example, a current approach using a learned decision tree is only capable of predicting new samples with an accuracy of less than 60%. On the other hand, using convolutional neural networks (CNNs), which can generalize well, requires to have some sort of visual data to detect the contrast between potholes and the surrounding road. Furthermore, such CNN-based approaches have mainly been developed for dedicated pothole detection. However, other road surface related events than potholes, such for example as speed bumps, can possibly be harmful to a vehicle, too, and can therefore be relevant for a driver warning function or an automated driving function.

To summarize, some main drawbacks of current techniques in classification in the context of pothole detection are the following: A limited feature space results in a lack of robustness when new tasks need to be dealt with. A simplified feature space leads to bad classification results. A large amount of data is required and the computational complexity is high. Finally, some approaches depend crucially on specific visual image data, such as camera pictures of potholes or continuous amplitude profiles.

It is an object of the present subject matter to present an efficient, accurate and performant scheme for classifying road conditions, e.g., in the context of assisted driving. The proposed scheme shall overcome at least some of the drawbacks of conventional methods mentioned above.

This object is solved by computer-implemented methods, computing devices, computer-readable storage media and computer programs according to the independent claims. Preferred embodiments are the subject matter of the dependent claims.

It should be noted that additional features of a claim dependent on an independent claim may, without the features of the independent claim or in combination with a subset of the features of the independent claim, constitute a separate invention independent of the combination of all features of the independent claim, which may be the subject of an independent claim, a divisional application or a subsequent application. The same applies equally to technical teachings described in the description which may constitute an invention independent of the features of the independent claims.

According to a first aspect of the present subject matter, a computer-implemented method of classifying a road surface object is presented.

As used herein, the term road surface object designates local features of a road surface that may be relevant for the security and/or comfort of a vehicle (or of drivers or passengers of the vehicle) when driving over the road surface feature. For example, local road surface depressions or damages, such as potholes, are road surface objects in the sense of the present specification. Other examples of road surface objects are local road surface elevations, such as speed bumps. Thus, the term road surface object may refer to local road surface conditions in a rather broad sense.

Classifying such road surface objects may be of interest for a driver warning function or an automated driving function. In other words, a result of the classification method presented herein may be used in a driver warning function or automated driving function of a vehicle.

As used in herein, the term vehicle shall be understood in a broad sense. For example, the term vehicle includes passenger cars, buses, commercial vehicles, transport vehicles, agricultural vehicles, and others.

Further, the term vehicle may refer to non-automated or (fully or partially) automated vehicles. In particular, the term vehicle may refer to a vehicle being equipped with a driver warning function that is configured to warn a driver if a road surface object that is potentially harmful to the vehicle lies ahead of the vehicle, such on a road or in a driving lane currently used by the vehicle, wherein the vehicle is driving towards the road surface object.

Additionally or alternatively, the vehicle may be equipped with an automated driving function that is configured to react automatically to an information that such a road surface object is ahead of the vehicle (or in a projected path of the vehicle), e.g., by adjusting a vehicle speed and/or a planned trajectory of the vehicle to avoid the road surface object or mitigate an effect of the road surface object when the vehicle drives over it. Additionally or alternatively, the automated driving function may consist in or comprise automatically adjusting parameters of the vehicle, such as parameters relating to a chassis of the vehicle, in dependence to the information about the road surface object.

As used herein, the term automated driving encompasses automated driving at any degree of automation, i.e., ranging from SAE-Level 1 to SAE-Level 5 according to SAE J3016. Thus, the term automated driving function as used herein also comprises driver assistance functions. In particular, the term automated driving function may comprise functions that enable a (fully or partially) automated longitudinal and/or transversal control of a vehicle.

As one step, the method comprises providing a set of data points that is attributable to a same road surface object, wherein each data point specifies a first variable and a second variable. In other words, each data point relates a value of the first variable to a value of the second variable.

For each given data point, the first variable characterizes a horizontal motion exhibited by a vehicle when driving over the road surface object and the second variable characterizes a vertical motion exhibited by said vehicle when driving over the road surface object. For example, the first variable and the second variable may result from measurements carried out by sensors of a vehicle when driving over the road surface object.

The horizontal motion characterized by the first variable and the vertical motion characterized by the second variable refer, for each data point, to a same event in which the vehicle has driven over the road surface object. For example, the vehicle may have exhibited the horizontal motion and the vertical motion essentially simultaneously when traversing the road surface object.

Accordingly, each data point may characterize an event in which a vehicle has traversed a road surface object with regard to a horizontal movement and a vertical movement that the vehicle has exhibited in this event.

It should be noted that the data points not only refer to different events but may also stem from different vehicles having experienced the different events.

For example, the data points may have been collected from a fleet comprising a plurality of vehicles that are configured to measure and record such data regarding a horizontal and vertical motion of the respective vehicle when driving over road surface objects, such as potholes. For example, the vehicles may be configured to send such recorded data over a wireless communication link to a backend, where a classification of the road surface objects may be carried out subsequently.

In the backend, the data points may first be clustered into sets of data points, each being attributed to a same road surface object. For example, the data may be sent from the vehicles of the fleet to the backend together with information on a geo-spatial position of the respective event, such that a plurality of data points may be attributed to a same road surface object at least in part based on this position information.

Further, a so-called map matching may be carried out in the backend, wherein the data points and/or the sets of data points attributed to a same road surface object are mapped to respective road sections in a digital map, such as lanelets in a pre-defined lanelet network.

In accordance with an embodiment, the clustering and/or map matching may be carried out according to or comprise aspects of a method of clustering data objects that is described in the applicant's German patent application 10 2022 122 259.4, which is incorporated herein by reference.

The step of providing the set of data points may or consist in or comprise receiving or reading the set of data points by a computing device or by a software module being executed on a computing device. For example, such a computing device may form a part of a backend that is in communication with a vehicle fleet, as mentioned above.

As a further step, the method comprises classifying the set of data points using an artificial neural network (ANN) with regard to a relevance of the road surface object represented by the set of data points for a driver warning function or an automated driving function of a vehicle. In particular, the ANN may comprise a convolutional neural network (CNN).

The set of data points may be provided to the ANN in the form of an image data file. In particular, the image data file may depict the data points in the form of a scatter plot plotting the second variable against the first variable, or vice versa.

In an embodiment, a speed of the vehicle is used as the first variable. In other words, the first variable may be a speed that the vehicle had when traversing the road surface object.

However, it is also within the scope of the present subject matter that the first variable may refer to a distance, i.e., an x-coordinate that characterizes the longitudinal movement of the vehicle with respect to a reference position.

In a further embodiment, the first variable may be an acceleration, in particular a longitudinal acceleration, of the vehicle when traversing the road surface object.

Further, in an embodiment, the second variable is an amplitude characterizing a vertical displacement of the vehicle. For example, the vehicle may exhibit an oscillation vertical movement when traversing the road surface object. In this case, an amplitude, such as a maximum amplitude, of the vertical oscillation may be used as the second variable.

For example, the second variable may refer to a vertical displacement as measured using a height sensor, such as a ride height sensor, of the vehicle in the moment when the vehicle drove over the road surface object. Thus, the second variable may comprise a vertical distance, such as a ride height or a change in the ride height. For example, such data may be provided by one or more height sensors, such as ride height sensors, being arranged at one or more suspensions of the vehicle.

In an alternative embodiment, the second variable may comprise a vertical acceleration amplitude. Such vertical dynamics data may, for example, be measured using one or more acceleration sensors of the vehicle and/or using one or more height sensors as described above.

In accordance with some embodiments, the second variable may be a normalized amplitude characterizing a vertical displacement of the vehicle. It should be understood in this context that the term "normalized" does not necessarily mean that the amplitude is in a range between 0 and 1. Rather, the "normalization" refers to a transformation that is applied to the fleet sensor data to make the amplitudes provided by different kinds or derivates of vehicles from the fleet comparable. For example, using raw amplitudes recorded by different kinds of vehicles while driving would mean that differences in the amplitudes arising mainly from different suspensions or wheel/rim combinations of the different vehicles would unintentionally be considered. As an example, if an SUV and a more dynamic vehicle drive over the same road surface object at the same speed, the SUV having, e.g., a multi-link axle would likely record different amplitudes than the more dynamic vehicle with less weight and, for instance, a torsion beam axle.

Further, in accordance with some embodiments, the set of data points comprises a first subset with data points specifying, as the second variable, an amplitude (such as a vertical displacement amplitude as described above) measured at a right side of the vehicle and a second subset with data points specifying, as the second variable, amplitudes (such as a vertical displacement amplitude as described above) measured at a left side of the vehicle. For example, the amplitudes specified by the first subset of data points may have been measured at a right rear suspension of the vehicle, whereas the amplitudes specified by the second subset of data points may have been measured at a left rear suspension of the vehicle. Alternatively, the amplitudes of the first subset and the second subset may have measured at a right front suspension and at a left front suspension, respectively.

When the data points are arranged in the form of scatter plots, the first subset of data points may be depicted in a way that is visually discernible from second subset of data points.

For example, in a scatter plot, wherein the speed is plotted on the x-axis and a (normalized) vertical displacement amplitude is plotted on the y-axis, a first subset of data points referring to amplitude measurements taken at the left rear suspension may be depicted as red circles and a second subset of data points referring to amplitude measurements taken at the right rear suspension may be depicted as black crosses. More generally, the data points of the first subset and the second subset may be coded by a marker shape and/or by a marker color, such that the possibility that the coding gets lost during preprocessing or during calculations within the ANN model itself is reduced.

By differentiating between measurements taken at the right side of the vehicle and measurements taken at the left side of the vehicle, the classification may consider valuable information about properties of the surface object that is represented by the set of data points. For example, if the scatter plot shows that the amplitudes measured at the right rear suspension is significantly higher than the one recorded on the left side, this may be a hint that the road surface object causing the recorded event is mainly located on the right side of the road. In this case, it may be concluded that the road surface object in question is rather a local road surface elevation extending only on one side of the road, as opposed to, e.g., a speed bump, which one would expect to impact the vertical motion of the left side and right side of the vehicle more or less equally.

In an embodiment, the method further comprises generating, supplementing or updating a digital map by relating a result of the classification (i.e., an information regarding a relevance of the road surface object for a driver warning function or an automated driving function) to a position of the road surface object. In other words, the method may comprise adding the classified road surface object to a digital map that indicates a position of the road surface object, for example, in terms of a road section or a lanelet in a lanelet network. Such position information may be based on a map matching step that may be carried out in dependence on geospatial information received together with the fleet sensor data on which the data points rely.

Preferably, a plurality of geo-located and classified road surface objects may thus be added to a digital map based on a classification of sensor data provided by a vehicle fleet, wherein the classification may be carried out, e.g., in a backend.

Apart from a potential use in a driver warning function or an automated driving function, such a digital map of road surface objects may also be useful for authorities in charge of carrying out road inspections and maintaining roads, as it may provide a comprehensive knowledge about locations of potholes or other damages of the road surface.

In an embodiment, the method further comprises providing such a digital map or a part of the digital map or information derived from the digital map to a vehicle for the purpose of a use of this information by a driver warning function or an automated driving function of the vehicle.

For example, the digital map, the part of the digital map or the information from the digital map may be sent to one or more vehicles via a wireless transmission link, such as a mobile communication channel. For example, the digital map, the part of the digital map or the information taken from the digital map may be sent to a vehicle or to an entire vehicle fleet from a backend, where the classification of the road surface objects may have been carried out, as described above.

An advantage of sending sensor data related to road surface events from a vehicle fleet to a backend and then performing extensive computations, such as a processing, clustering, and classification, in the backend, is that the computing power that is available in a backend is usually superior as compared to the one available in each vehicle. For example, some conventional methods, wherein data obtained from vehicle sensors, such as camera, RADAR, or LIDAR, are processed on board to learn and classify road conditions, suffer from challenges regarding scalability and applicability to a whole vehicle fleet. This is due to the limited presence of the required sensor technology and computing power available on board the vehicles of the fleet. By contrast, the approach proposed herein, is advantageous in that it relies on a backend processing of recorded fleet sensor data that can be generated and exploited more easily as well as more extensively than, for example, camera images of potholes.

A further advantage of the approach presented herein is that if the digital map (or information derived therefrom) is provided to a vehicle fleet, any vehicle of the fleet having a navigation system may be able to benefit from the information on the road surface objects contained in the digital map, e.g., by operating a driver warning function or an automated driving function in dependence on this information. To this end, a vehicle that receives such information about road surface objects need not necessarily be equipped with advanced sensors, such as LIDAR or RADAR, itself, but it may benefit from sensor information related to road surface objects that was ultimately provided by other vehicles of the fleet (i.e., the data points used for the classification of the road surface objects). By using a fleet intelligence in this manner, a fleet of vehicles that may receive such information and use it for operating driver warning functions and/or automated driving functions may be much larger than the fleet of vehicles that provide the sensor information used for the classification of road surface objects in the backend.

In a second aspect of the present subject matter, a computer-implemented method of operating a driver warning function or an automated driving function of a vehicle is proposed. The method comprises the following steps being performed by one or more computing devices, such as one or more electronic control units, of the vehicle: receiving information with regard to a relevance of a road surface object for a driver warning function or an automated driving function of the vehicle, wherein the information results from a classification of the road surface object using a method according to the first aspect of the present subject matter; and generating one or more control commands for controlling the driver warning function and/or the automated driving function in dependence on the received information.

For example, the computing device(s) of the vehicle may receive the information from a backend.

For example, the computing device(s) may receive information specifically for one or more road surface objects being located in a projected vehicle path, such as in a section of a road that the vehicle is currently travelling on and in the direction of travel of the vehicle. Additionally or alternatively, it may be provided that the computing device(s) generally receive(s) information about road surface objects in a relevant area, such as using an update of a digital map comprising a plurality of road surface objects, each being attributed to a specific geo-location, such as a specific lanelet in a lanelet network.

As a third aspect of the present subject matter, a computer-implemented method of training an ANN to classify road surface objects is presented.

The ANN to be trained may be an ANN used for a method of classifying a road surface object according to the first aspect of the present subject matter. Accordingly, what has been stated above and what will be stated in the following about the ANN and the related method according to the first aspect of the present subject matter may apply equally to the ANN to be trained using the method according to the third aspect of the present subject matter, and vice versa.

The method comprises providing a plurality of data points, each data point specifying a first variable and a second variable.

In this context, "providing" may comprise receiving, reading and/or temporality or permanently storing the plurality of data points by a computing device or by a software module carrying out at least a part of the method of training the ANN.

The term module (and other similar terms such as unit, subunit, submodule, etc.) in the present disclosure may refer to a software module, a hardware module, or a combination thereof. Modules implemented by software are stored in memory or non-transitory computer-readable medium. The software modules, which include computer instructions or computer code, stored in the memory or medium can run on a processor or circuitry (e.g., ASIC, PLA, DSP, FPGA, or other integrated circuit) capable of executing computer instructions or computer code. A hardware module may be implemented using one or more processors or circuitry. A processor or circuitry can be used to implement one or more hardware modules. Each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices and stored in memory or non-transitory computer readable medium.

The first variable characterizes a horizontal motion exhibited by a vehicle when driving over the road surface object and the second variable characterizes a vertical motion exhibited by said vehicle when driving over the road surface object. What has been stated above about the first and second variables in connection with the first aspect of the present subject matter equally applies to the first and second variables in connection with the third aspect of the present subject matter.

The method further comprises providing ground truth (GT or gt) data indicating (as a GT label) a respective relevance of a plurality of road surface objects for a driver warning function or an automated driving function.

For example, the GT data may have been acquired during a number of test drives with one or more vehicles, wherein test drivers may have manually labeled different events of driving over road surface objects according to a relevance of the respective road surface object for a driver warning function or an automated driving function. For example, a test driver may have indicated that a certain pothole is so deep that a driver should be warned before driving over it.

Accordingly, the GT data may provide a mapping of certain geo-located events related to road surface conditions to an information as to whether a warning by a driver warning system or a reaction by an automated driving function would be appropriate.

The method further comprises clustering the data points into a plurality of sets of data points, such that each data point of a same set of data points is attributable (e.g., with a certain likelihood) to a same road surface object. For example, this clustering step may be based at least in part on a map matching of the data points, wherein data points are attributed to lanelets of a lanelet network according to a geospatial position where the respective sensor measurements have taken place.

The method further comprises matching the GT data with the sets of data points to obtain a plurality of sets of data points, wherein each set of data points is attributable to a respective road surface object and (based on the GT label associated with the road surface object) to a relevance of the road surface object for a driver warning function or an automated driving function.

For each set of data points, an image data file depicting the data points in the form of a scatter plot is generated.

Further, the method comprises training an ANN to classify road surface objects by using the image data files and the corresponding GT information regarding the relevance of the respective road surface objects as training data. In other words, a supervised training of an ANN, which may for example comprise a CNN, may be carried out by using the image data files in connection with the GT information as training data. For example, for the purpose of the training, each image data file may be logically labeled with regard to the corresponding GT label indicating the relevance of the respective road surface object.

It is also within the scope of the present subject matter that the training of the ANN may comprise transfer learning. For example, in an embodiment, the method of training the ANN comprises providing a pretrained CNN that has been trained for image classification of other image data files. For example, the other image data files may be of different kind than the ones mentioned above (showing the scatter plots), such as, e.g., images of vegetables, images of animals, or the like. For example, the pretrained CNN may be a very large network that has been trained with an extensive amount of training images. An example of such a large pretrained networks is the CNN Xception, which was introduced by Chollet, 2017.

The method may further comprise adding one or more layers to the pretrained CNN. For example, one or more final layers may be added to the pretrained CNN. Preferably, the one or more added layers are fully connected (FC) layers. Adding the one or more layers to the pretrained CNN may comprise replacing one or more layers of the pretrained CNN with the one or more added layers.

The method may comprise training in particular the added layer with the image data files depicting the scatter plots as training data. For example, in an embodiment, only the one or more added layer(s) are trained with the image data files depicting the scatter plots as training data, whereas the parameters of the pretrained CNN may be frozen during the training (i.e., left unchanged by the training).

According to a fourth aspect of the present subject matter, a computing device is configured for executing a computer-implemented method according to one or more of the first, second, and third aspects of the present subject matter. The explanations and descriptions of embodiments of the methods explained above and in the following may analogously apply to embodiments of the computing device according to the fourth aspect—and vice versa.

For example, in accordance with an embodiment, a computing device being configured for executing a method of classifying a road surface object according to the first aspect of the present subject matter may be arranged in a backend environment.

Further, in accordance with an embodiment, a computing device being configured for executing a method of operating a driver warning function or an automated driving function according to the second aspect of the present subject matter may be arranged on board the vehicle, such as in the form of or as part of an electronic control unit of the vehicle.

Further, in accordance with an embodiment, a computing device being configured for executing a method of training an artificial neural network to classify road surface objects according to the third aspect of the present subject matter may be used in a laboratory or development environment or in a backend.

In a fifth aspect, a computer program comprises instructions which, when the program is executed by a computing device (such as a computing device according to the fourth aspect of the present subject matter), cause the computing device to carry out a method according to one or more of the first, second, and third aspects of the present subject matter.

In a sixth aspect, a computer-readable storage medium comprises instructions which, when executed by a computing device (such as a computing device according to the fourth aspect of the present subject matter), cause the computing device to carry out a method according to one or more of the first, second, and third aspects of the present subject matter.

Those skilled in the art will recognize additional features and advantages upon reading the following detailed description, and upon viewing the accompanying drawings.

Reference will now be made in detail to various embodiments, one or more examples of which are illustrated in the figures. Each example is provided by way of explanation and is not meant as a limitation of the present subject matter. For example, features illustrated or described as part of one embodiment can be used on or in conjunction with other embodiments to yield yet a further embodiment. It is intended that the present subject matter includes such modifications and variations. The examples are described using specific language which should not be construed as limiting the scope of the appended claims. The drawings are not scaled and are for illustrative purposes only. For clarity, the same elements or method steps have been designated by the same references in the different drawings if not stated otherwise.

Other objects, advantages and novel features of the present subject matter will become apparent from the following detailed description of one or more preferred embodiments when considered in conjunction with the accompanying drawings.

BRIEF DESCRIPTION OF THE DRAWINGS

FIG. 1 shows steps of a computer-implemented method of classifying a road surface object in accordance with one or more embodiments.

FIG. 2 shows steps of a computer-implemented method of operating a driver warning function or an automated driving function in accordance with one or more embodiments.

FIG. 3 shows steps of a computer-implemented method of training an artificial neural network to classify road surface objects in accordance with one or more embodiments.

DETAILED DESCRIPTION

Figure 4:
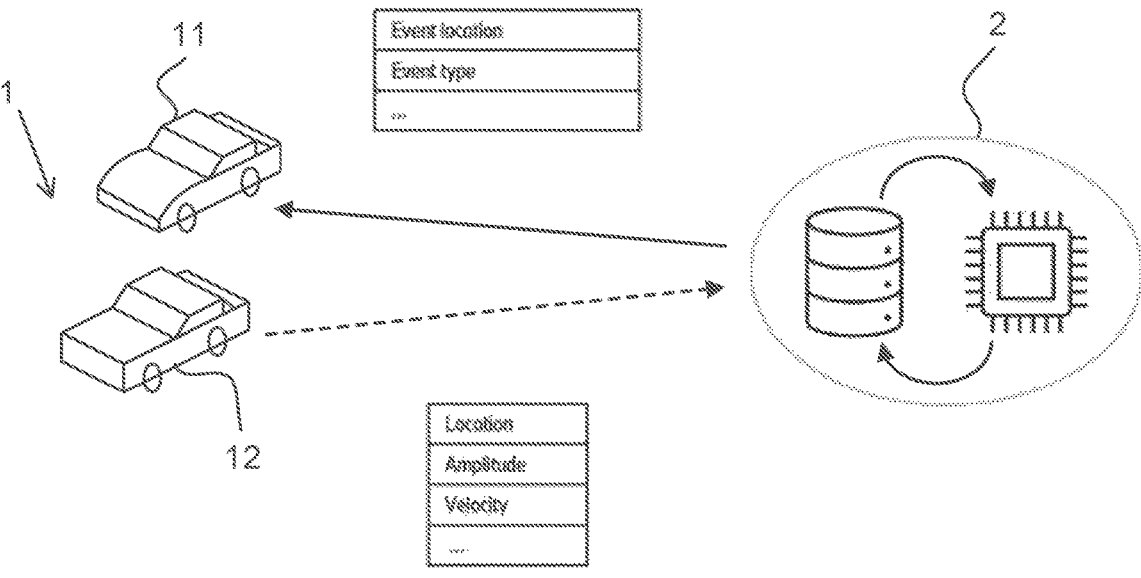
FIG. 4 schematically illustrates an application scenario involving a vehicle fleet and a backend, wherein a method according to FIG. 1 may be executed in the backend and a method according to FIG. 2 may be executed in the vehicle.

FIG. 1 shows steps of a computer-implemented method of classifying a road surface object.

The method comprises providing a set of data points that is attributable to a same road surface object, each data point specifying a first variable and a second variable. For each data point, the first variable characterizes a horizontal motion exhibited by a vehicle when driving over the road surface object and the second variable characterizes a vertical motion exhibited by said vehicle when driving over the road surface object.

The method further comprises classifying the set of data points using an artificial neural network (ANN) with regard to a relevance of the road surface object for a driver warning function or an automated driving function.

FIG. 2 shows steps of a computer-implemented method of operating a driver warning function or an automated driving function of a vehicle.

The method comprises the following steps, which are carried out by one or more computing devices, such as one or more electronic control units, of the vehicle: receiving information with regard to a relevance of a road surface object for a driver warning function or an automated driving function, wherein the information results from a classification of the road surface object that has been carried out according to the method illustrated in FIG. 1; and generating one or more control commands for controlling the driver warning function or the automated driving function in dependence on the received information.

FIG. 3 shows steps of a computer-implemented method of training an ANN to classify road surface objects.

The method comprises providing a plurality of data points, wherein each data point specifies a first variable and a second variable. For each data point, the first variable characterizes a horizontal motion exhibited by a vehicle when driving over the road surface object and the second variable characterizes a vertical motion exhibited by said vehicle when driving over the road surface object.

The method further comprises ground truth data indicating a respective relevance of a plurality of road surface objects for a driver warning function or an automated driving function.

The method further comprises clustering the data points into a plurality of sets of data points, such that each data point of a same set of data points is attributable to a same road surface object.

The method further comprises matching the ground truth data with the sets of data points to obtain a plurality of sets of data points, each set of data points being attributable to a respective road surface object and to a relevance of the road surface object for a driver warning function or an automated driving function.

The method further comprises generating, from each set of data points, an image data file depicting the data points in the form of a scatter plot.

The method further comprises training an ANN to classify road surface objects by using the image data files and the corresponding ground truth information regarding the relevance of the respective road surface objects as training data.

In the following, aspects of examples of the methods shown in FIGS. 1-3 will be explained in more detail with reference to the remaining FIGS. 4-9.

FIG. 4 schematically illustrates an interplay between a vehicle fleet 1 and a backend 2.

A computing device in the backend 2 is programmed to classify road surface objects according to the method shown in FIG. 1.

The backend 2 provides a result of the classification via a wireless downstream connection (indicated by a solid arrow) to a first vehicle 11 of the fleet 1.

In FIG. 4, the first vehicle 11 is representative of a plurality of vehicles of the fleet 1 which are configured to receive such information from the backend 2 and to use this information for operating a driver warning function or an automated driving function in accordance with the method of FIG. 2.

For example, such information provided via the downstream link may indicate a position of a road surface object ("Event location"), as well as a respective relevance of the road surface objects for the driver warning function or the automated driving function ("Event type", e.g., a pothole that the driver should be warned of). For example, the information may be provided to the first vehicle 11 in the form of a digital map or as information taken from a digital map.

A second vehicle 12 shown in FIG. 4 is representative of a plurality of vehicles of the fleet 1 which are configured to record sensor data characterizing each of a vertical motion and a horizontal motion of the vehicle when driving over a road surface object, such as a pothole. The vehicles 12 are further configured to send the recorded sensor data via a wireless upstream connection (indicated by a dashed arrow) to the backend 2.

For example, the upstream information may include, for every recorded event, a location of the event in which the vehicle has traversed the road surface object, a speed (or velocity) at which the vehicle has traversed the road surface object, and a vertical displacement amplitude that the vehicle has exhibited when traversing the road surface object. In the backend processing, the measured speed and the measured vertical displacement amplitude may be used as the first and second variables, respectively, when carrying out a classification of road surface objects according to the method of FIG. 1.

In an embodiment, the processing of the fleet sensor data in the backend may comprise several consecutive steps:

A preprocessing step may comprise filtering the data to reduce noise. The preprocessing may further comprise a so-called map matching process, wherein raw geospatial data that are provided together with the sensor data are matched to a lanelet network.

In a clustering step, the data are clustered into sets of data points, such that each set of data points contains data points that have likely been caused by a same road surface object.

The classification of the road surface objects is then carried out based on the sets of data points. As a result of the classification, each set of data points may be attributed a type of object (e.g., "pothole" or "speedbump"). Further, the sets of data points are classified regarding a necessity to warn the driver of the respective road surface object.

Finally, the result of the classification can be stored in a digital map again, so that when a vehicle 11 from the fleet 1 enters a certain area it can download the relevant information regarding the road conditions as well as the locations of the found events. Consequently, if the vehicle 11 is about to cross such an event, the driver may be warned of the upcoming event or an automated driving function of the vehicle 11 may automatically control a longitudinal and/or lateral movement of the vehicle, e.g., to avoid the road surface object or to mitigate its impact.

In accordance with the embodiment described above, the method of FIG. 1 may further comprise generating, supplementing or updating a digital map by relating a result of the classification to a position of the road surface object. The digital map, a part of the digital map or information derived from the digital map may then be provided to a vehicle, such as to the first vehicle 11 in FIG. 4, for use by a driver warning function or an automated driving function of the vehicle 11.

Figure 5:
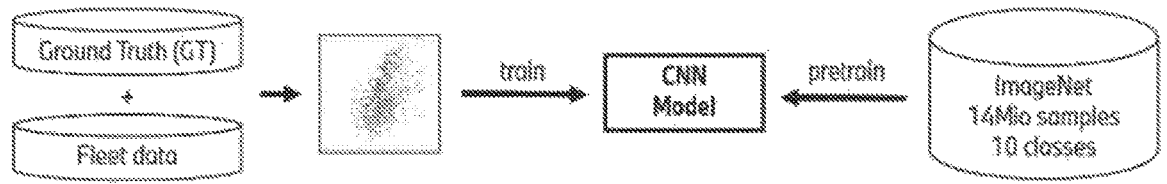
FIG. 5 schematically illustrates aspects of an example of the method of training an artificial neural network to classify road surface objects shown in FIG. 3.
Figure 6:
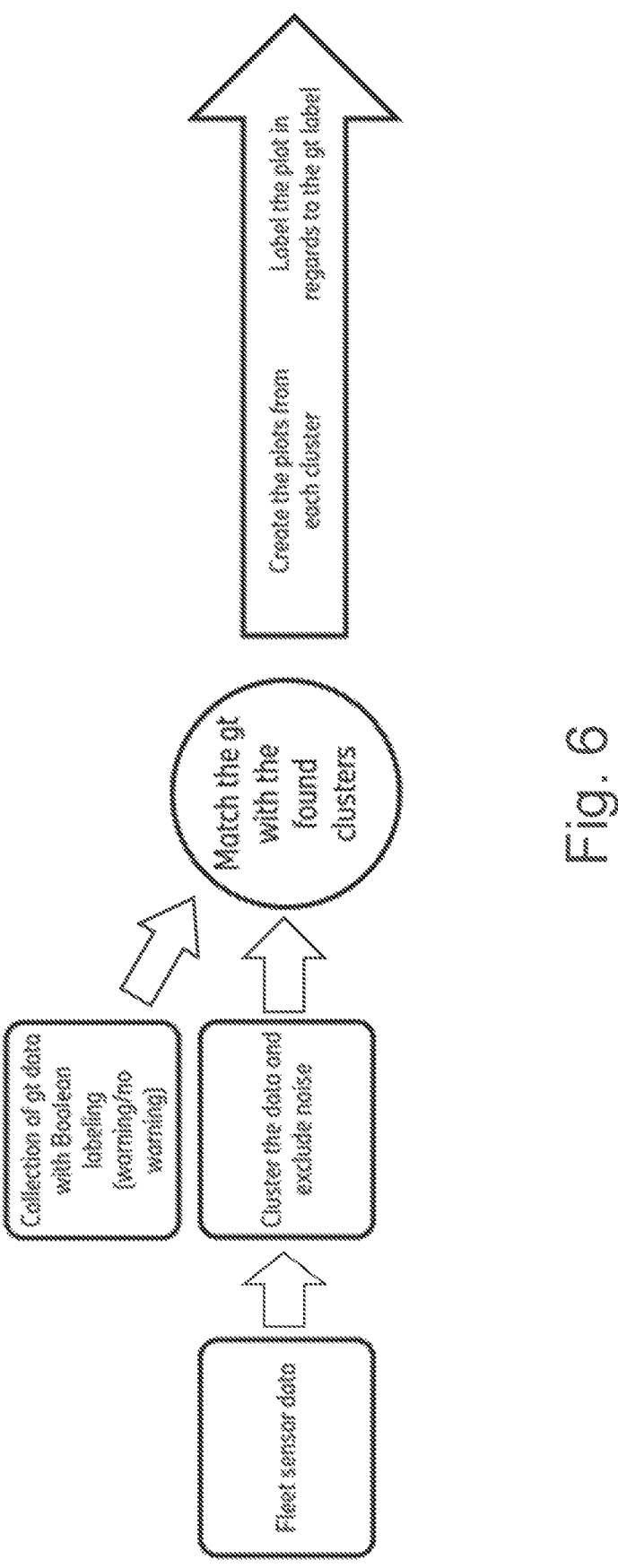
FIG. 6 schematically and exemplarily illustrates a process of generating training datasets in accordance with the training method of FIG. 3.

FIG. 5 schematically illustrates aspects of an embodiment of the method of training an ANN to classify road surface objects shown in FIG. 3. FIG. 6 schematically and exemplarily illustrates a process of generating training datasets in accordance with the training method of FIG. 3.

In the following, reference is made to FIG. 5 and FIG. 6 together to explain aspects of a training method including the generation of training data according to an embodiment.

For example, an ANN that is used in the backend processing for classifying road surface objects in the example described above with reference to FIG. 4 may have been trained according to the scheme presented in FIGS. 5 and 6.

In the schemes of FIGS. 5 and 6, and in accordance with the method steps shown in FIG. 3, ground truth (GT or gt) data and fleet data are provided.

The fleet data comprise recorded sensor data characterizing a horizontal motion (first variable) and a vertical motion (second variable) that vehicles 12 have exhibited while driving over different road surface objects, as explained above with reference to FIG. 4.

The GT data may have been acquired during a number of test drives with one or more vehicles, wherein test drivers may have manually labeled different events of driving over road surface objects according to a relevance of the respective road surface object for a driver warning function or an automated driving function. For example, a test driver may have indicated that a certain pothole is so deep that a driver should be warned before driving over it.

The data points of the fleet data are clustered into a plurality of sets of data points, such that each data point of a same set of data points is attributable to a same road surface object.

Further, the GT data are matched with the sets of data points to obtain a plurality of sets of data points, each set of data points being attributable to a respective road surface object and to a relevance of the road surface object for a driver warning function or an automated driving function.

Then, for each set of data points, an image data file depicting the data points in the form of a scatter plot is generated, wherein, for the purpose of training an ANN to classify road surface objects based on the scatter plots as training data, each image data filed is logically labeled according to the corresponding GT label indicating the relevance of the respective road surface object.

Finally, in the example of FIG. 5, a supervised training of an ANN, which in this example comprises a pretrained CNN, is carried out, wherein the image data files in connection with the GT information are used as training data for the supervised training. The ANN thus learns from the scatter plots representing the GT events and, as a result, is able to perform a binary prediction whether the driver should be warned or not.

For example, the training may be carried out such that it affects only one or a few layers added to a very large CNN, which has been pretrained with a huge number (e.g., 14 million samples) of other images, i.e., images depicting objects that may be entirely different from such scatter plots. This aspect of a so-called transfer learning will be explained in more detail below with reference to FIG. 8.

Figure 7A:
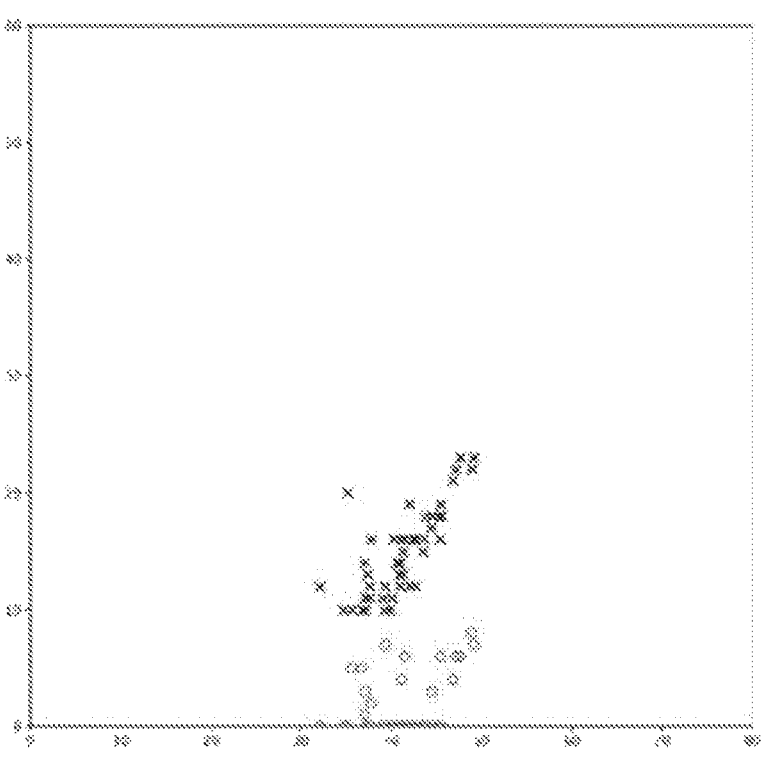
FIGS. 7A-7B show example scatter plots that may be used as input data representing road surface objects in the classification method of FIG. 1 or as training data in the training method of FIG. 3.
Figure 7B:
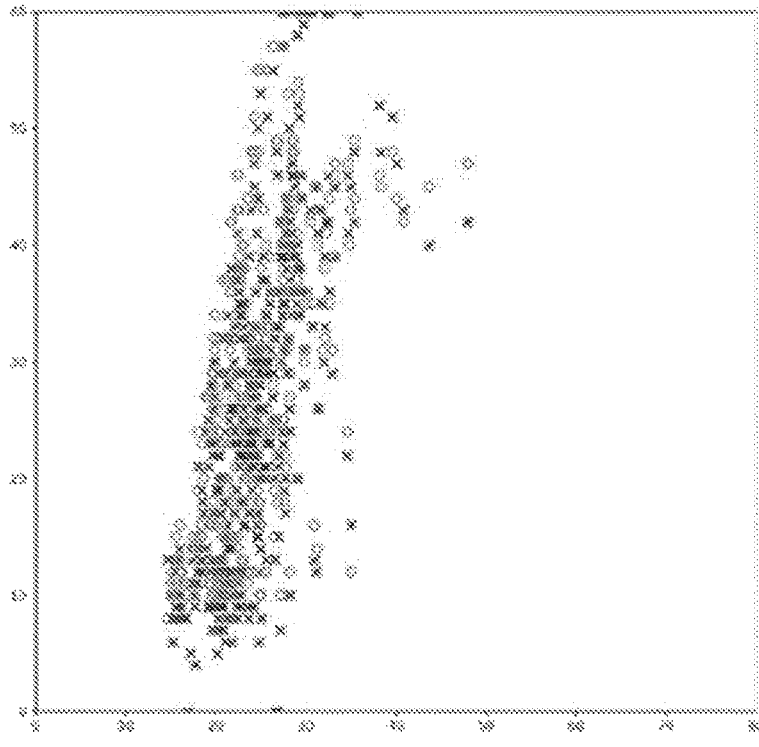

FIGS. 7A-7B show two example scatter plots that represent two different road surface objects. Such scatter plots (in the form of image data files) may be used as input data for the ANN in the classification method of FIG. 1 or as training data for the ANN in the training method of FIG. 3.

Each of the scatter plots comprises a plurality of data points stemming from a measurement of a first variable and a second variable when a vehicle has traversed the road surface object that is represented by the respective scatter plot. Specifically, in the examples shown in FIGS. 7A-7B, the x-axis indicates a recorded vehicle speed in km/h of each data point and the y-axis indicates a normalized vertical displacement amplitude of each data point, as measured by a height sensor arranged at a wheel suspension of the vehicle.

For example, the depicted scale from 0 to 60 on the y-axis may approximately correspond to a vertical displacement amplitude in a range from 2 cm (corresponding to the value 0 on the y-axis) to 8 cm (corresponding to the value 60 on the y-axis), wherein the amplitudes have been normalized to make the amplitudes of different vehicle types or derivates comparable.

It should be noted that in each of the scatter plots, a first subset of data points referring to amplitude measurements taken at the left rear suspension is indicated by red circles (depicted in grey in the Figures) and a second subset of data points referring to amplitude measurements taken at the right rear suspension is depicted as black crosses. In other words, data points stemming from measurements taken on the left side and on the right side of the vehicle, respectively, are coded by a different marker shape as well as by a different marker color.

It can be observed that the two scatter plots in FIG. 7A and in FIG. 7B differ drastically in the values of the data points, the density of datapoints and the comparison between the two subsets of data points. For example, the scatter plot shown in FIG. 7B comprises only a few data points at relatively high speeds.

Further, in the scatter plot shown in FIG. 7A, the amplitude recorded at the right rear suspension is significantly higher than the one recorded on the left side. This suggests that the event was mainly on one side of the road, which excludes events like speedbumps. By contrast, in the scatter plot shown in FIG. 7B, the road surface object was apparently traversed by both sides of the vehicle.

It is intended that the scatter plots in FIGS. 7A and 7A have no visible labels, to avoid learning irrelevant features in addition to the depicted data points. If labels were visible in the scatter plots, the ANN would learn such irrelevant features because the activations of the ANN depend on contrast changes in the widest sense.

By relying on scatter plots such as the ones shown in FIGS. 7A and 7B as "pictures" of road surface objects, the methods proposed herein avoid using a complex predefined feature vector which of the kind that is conventionally used as an input for, e.g., a deep ANN. Instead, the methods proposed herein advantageously make use of implicit features contained in such scatter plots, which turn out to be a rather robust and comprehensive representation of road surface objects, for example, with respect to their relevance for a driver warning function. Further, in contrast to conventional approaches, the methods proposed herein do not require extensive expert knowledge beforehand or complex modeling to define a complex feature space.

It is also worth mentioning, that it would be practically impossible translate the two samples shown in FIGS. 7A and 7B (with all their implicit dependencies) into a feature vector that could be used as an input for, e.g., an ANN. This is because the size of the input vector of the sample shown in FIG. 7A would be smaller as compared to the size of the input vector of the sample shown in FIG. 7B. By contrast, the approach proposed herein provides a robust and generic technique that is independent of the size of the input. Furthermore, it does not require preliminary assumptions to compare samples, such as taking the average velocity in addition to, e.g., its variance or standard deviation. Instead, the approach proposed herein allows using the available information including many implicit features contained therein.

For example, in an embodiment, the method of training the ANN comprises providing a pretrained CNN that has been trained for image classification of other image data files. For example, the other image data files may be of a different kind than the ones mentioned above (showing the scatter plots), such as, e.g., images of vegetables, images of animals, or the like. For example, the pretrained CNN may be a very large network that has been trained with an extensive amount of training images. An example of such a large pretrained networks is the CNN Xception, which was introduced by Chollet, 2017.

The method may further comprise adding one or more layers to the pretrained CNN. For example, one or more final layers may be added to the pretrained CNN.

The one or more added layers may comprise fully connected (FC) layers. In an embodiment, at least one added layer is a fully connected layer.

Adding the one or more layers to the pretrained CNN may comprise replacing one or more layers of the pretrained CNN with the one or more added layers.

The method may comprise training in particular the added layer(s) with the image data files depicting the scatter plots as training data. For example, in an embodiment, only the one or more added layer(s) are trained with the image data files depicting the scatter plots as training data, whereas during the training, the parameters of the pretrained CNN may be frozen (i.e., left unchanged by the training).

As mentioned before, CNNs are especially beneficial in terms of computational complexity because of the reduced number of weights (and biases) required to describe the neural network. However, even if this reduces the size of the problem significantly, a large CNN can still have multiple millions of weights. This is a challenge not only due to complexity or runtime constraints, but it also requires the training dataset to be reasonably large. To overcome this challenge, transfer learning may be used. This technique generally describes the process of using pretrained networks for a new problem. More precisely a neural network—in this case a CNN—is trained on different data beforehand. Afterwards, only a few layers are trained for the actual task on the actual training data.

Transfer learning is usually applied in situations where the two problems are sufficiently similar and thus similar decision criteria can be learned and subsequently used (Weiss et al., 2016). This can be the case, for instance, when an ANN that was trained and used for extracting the opinion of writers from restaurant reviews is now used for different tasks that include extracting the semantics of language, e.g., as a module of a chatbot. However, as the present problem of pothole detection, or more precisely, the problem of extracting information from scatter plots, is a highly specialized task, the limits of what is possible in terms of transfer learning must be pushed even further. Consequently, in the present context, the pretrained CNN can be understood as a feature extractor rather than a classifier.

Figure 8:
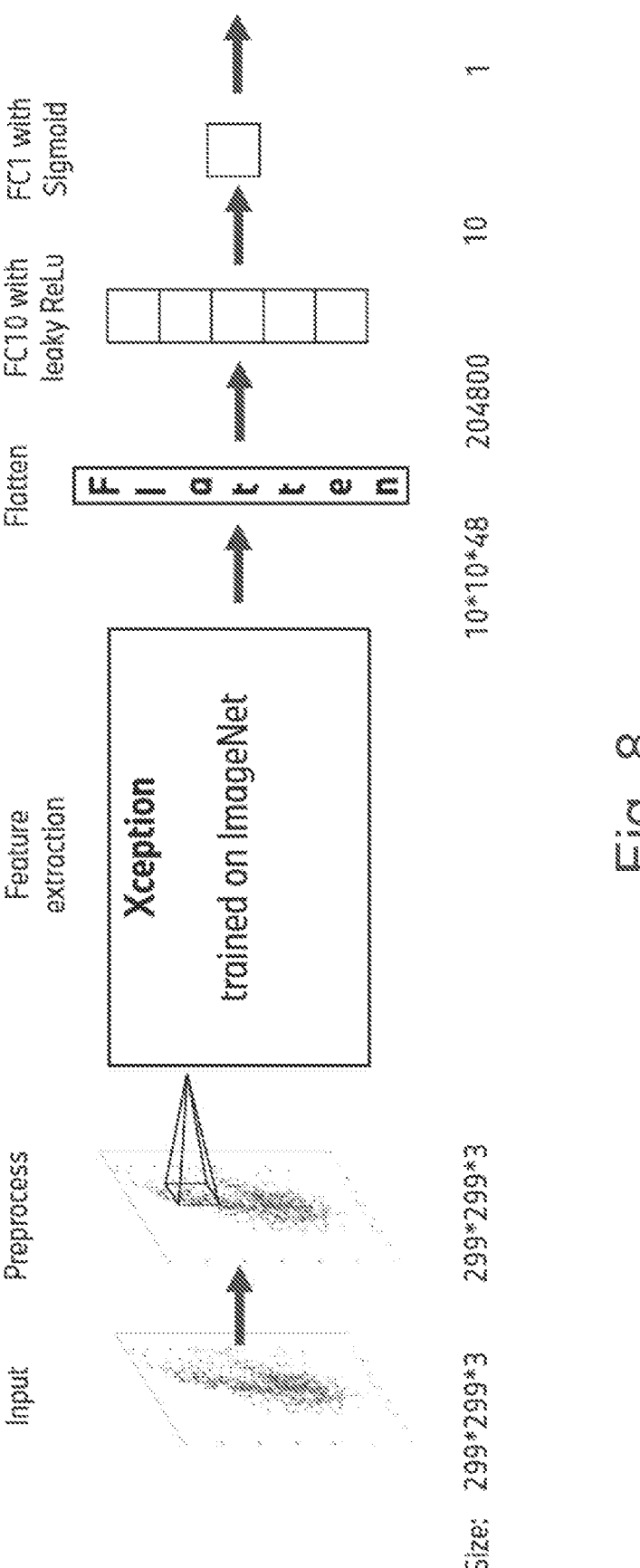
FIG. 8 schematically and exemplarily illustrates an architecture of an artificial neural network that may be trained to classify road surface objects.

In an embodiment that is illustrated in FIG. 8, a promising pretrained CNN named Xception is used. Xception was introduced by Chollet, 2017 and is available in libraries like Keras or Matlab. It performs well compared to other network architectures whilst having fewer weights (Bianco et al., 2020).

It may be worth mentioning that when just evaluating the model on a benchmark, like, e.g., the top 5 accuracy on ImageNet (a public dataset consisting of more than 14 Mio samples of 1000 classes), there are newer architectures outperforming Xception, one example being the CoCa architecture. Regardless, since the actual task differs substantially from classifying ImageNet, it is not that important how good the model performs on classifying ImageNet, but rather how well the model can be used for the task.

To overcome the difference in the task, additional fully connected (FC) layers, FC10 and FC1, were added in combination with a flattening layer that is provided to adapt the dimensions. For the activation function in the FC, layer, FC10, a leaky ReLu was used, which combines the general benefits of a ReLu with the advantage of having a small slope for values smaller than zero, thus dealing with the problem of dying ReLus, which is a well-known phenomenon that can occur during training. The term "dying ReLu" describes the problem that adjusting the weights between layers does not change the final loss anymore because to the output is negative, which results in no activation (=0) at all when using a ReLu. The size of the negativity, however, is not considered because to the slope is 0 as well. Therefore, e.g., ReLu(−100)=0, as is ReLu(−0.3).

Figure 9:
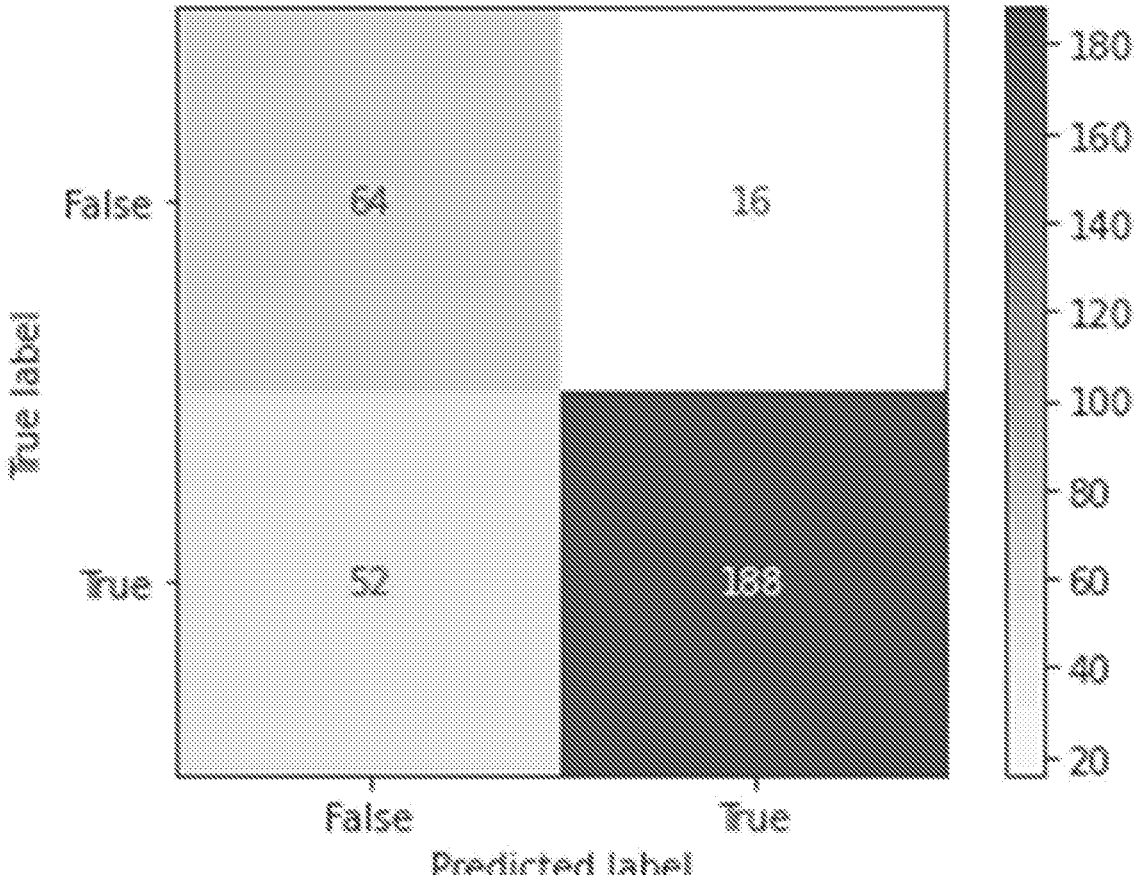
FIG. 9 shows an evaluation of a classification performance of the artificial neural network of FIG. 8 after 10 training epochs.

FIG. 9 shows an evaluation of a classification performance of the ANN of FIG. 8 after 10 training epochs, wherein scatter plots of the type shown in FIGS. 7A and 7B have been used as training data.

The ANN that was evaluated had the following numbers of parameters:

Total parameters: 22,909,501
Trainable parameters: 2,048,021 (FC layers+bias)
Non-trainable parameters: 20,861,480 (Xception without the final layer)

Due to the small number of trainable weights, the training can be performed locally in sufficient time. The prediction of unseen data is, as mentioned, independent of the number of data and can be computed locally.

The results of a training for 10 epochs on the GT data can be observed in FIG. 9, where "True" means that the driver should be warned of the respective event and "False" means that no warning should be given.

The GT data consist of 1264 examples. The model was trained on 70% of these GT samples (training set) and the subsequent prediction was carried out on the remaining 30%, which the model had not yet seen (testing set).

For example, in one training session, a final performance with an accuracy of 0.7875 and an F1-score of 0.8468 were achieved. These values of the accuracy and the F1-score are higher by 20% and 25%, respectively, compared to a current software, which classifies road surface objects according to their relevance for warning based on classical machine learning approaches.

It can thus be seen that the model performs well, especially when considering the comparatively small dataset and the task, which differs substantially from the image classification task that Xception was trained for.

Moreover, it should be noted that the final Sigmoid layer allows the developer to adjust the confidence of the model in terms of positive predictions. By default, if the predicted value is >0.5, an object is classified as true, and otherwise as false. However, this threshold can be increased manually, so that the model does not predict "true" if its confidence is low (e.g., near to 0.5). In the present example, the threshold has been set to 0.7. This behavior is especially advantageous for a binary classification that decides whether a human shall be warned of a road surface object or not, as there is a different subjective perception of false positives and false negatives. Generally, a driver is more likely to be negatively affected by the system if it outputs false positives frequently as compared to when the system produces false negatives, which results in the subjective impression that she/he is "better than the system."

The foregoing disclosure has been set forth merely to illustrate the present subject matter and is not intended to be limiting. Since modifications of the disclosed embodiments incorporating the spirit and substance of the present subject matter may occur to persons skilled in the art, the present subject matter should be construed to include everything within the scope of the appended claims and equivalents thereof.

What is claimed is:

1. A computer-implemented method comprising:
classifying a road surface object by a method comprising:
providing a set of data points that is attributable to a same road surface object, each data point specifying a first variable and a second variable, wherein for each data point:
the first variable characterizes a horizontal motion exhibited by a first vehicle when driving over the road surface object; and
the second variable characterizes a vertical motion exhibited by said first vehicle when driving over the road surface object; and
classifying the set of data points using an artificial neural network based on a relevance of the road surface object to a driver warning function or an automated driving function;
wherein the set of data points is provided to the artificial neural network in a form of an image data file that depicts the data points in the form of a scatter plot;
wherein the set of data points comprises:
a first subset with data points specifying, as the second variable, an amplitude measured at a right side of the first vehicle; and
a second subset with data points specifying, as the second variable, an amplitude measured at a left side of the first vehicle; and
wherein the scatter plot depicts the first subset of data points and the second subset of data points with different marker symbols and/or with different marker shapes; and
operating an automated driving function or a driver warning function of a second vehicle by a method comprising the following steps being performed by one or more computing devices of the second vehicle:
receiving information with regard to a relevance of a road surface object for an automated driving function or a driver warning function, wherein the information results from the classification of the road surface; and
generating a control command for controlling the automated driving function or the driver warning function in dependence on the received information.

2. The method of claim 1, wherein the first variable is a speed of the first vehicle.

3. The method of claim 1, wherein the second variable is an amplitude characterizing a vertical displacement of the first vehicle.

4. The method of claim 1, further comprising:
generating, supplementing or updating a digital map by relating a result of the classification to a position of the road surface object.

5. The method of claim 4, further comprising:

providing the digital map or a part of the digital map or information derived from the digital map to a vehicle for use by a driver warning function or an automated driving function.

6. A computing device being configured for executing a method according to claim 1.

7. A computer-readable storage medium comprising instructions which, when executed by a computing device, cause the computing device to carry out a method according to claim 1.

8. The computer-implemented method of claim 1, wherein the first vehicle and the second vehicle are different vehicles.

9. The computer-implemented method of claim 1, wherein the first vehicle and the second vehicle are the same vehicle.

10. A system comprising:

a first vehicle of a vehicle; and a backend comprising a computing device that is in communication with the first vehicle;

wherein the computing device of the backend is configured to:

receive, via a wireless upstream connection, sensor data from a second vehicle of the vehicle fleet, the sensor data characterizing each of a vertical motion and a horizontal motion performed by the second vehicle when driving over a road surface object;

classify, with the computing device, the road surface object based on a set of data points corresponding to the received sensor data, wherein to classify the road surface, the computing device is configured to:

provide a set of data points that is attributable to a same road surface object, each data point specifying a first variable and a second variable, wherein for each data point:

the first variable characterizes the horizontal motion exhibited by a second vehicle when driving over the road surface object; and the second variable characterizes the vertical motion exhibited by the second vehicle when driving over the road surface object; and classify the set of data points using an artificial neural network based on a relevance of the road surface object to a driver warning function or an automated driving function;

wherein the set of data points is provided to the artificial neural network in a form of an image data file that depicts the data points in the form of a scatter plot;

wherein the set of data points comprises:

a first subset with data points specifying, as the second variable, an amplitude measured at a right side of the second vehicle; and a second subset with data points specifying, as the second variable, an amplitude measured at a left side of the second vehicle; and wherein the scatter plot depicts the first subset of data points and the second subset of data points with different marker symbols and/or with different marker shapes;

provide the result of the classification of the road surface object to the first vehicle; and wherein the first vehicle is configured to operate a driving warning function or an automated driving function in dependence on the result of the classification of the road surface object, where to operate the automated driving function or the driving warning function, the first vehicle is configured to:

receive information with regard to a relevance of a road surface object for an automated driving function or a driver warning function, wherein the information results from the classification of the road surface; and generate a control command for controlling the automated driving function or the driver warning function in dependence on the received information.

* * * * *